June 2, 1936.　　　　R. B. RANSOM　　　　2,042,482
STEERING MECHANISM FOR FOUR-WHEELED VEHICLES
Filed Sept. 7, 1934　　　2 Sheets-Sheet 1

WITNESSES

INVENTOR
Richard B. Ransom
BY
Munn, Anderson & Liddy
ATTORNEYS

June 2, 1936.  R. B. RANSOM  2,042,482
STEERING MECHANISM FOR FOUR-WHEELED VEHICLES
Filed Sept. 7, 1934   2 Sheets-Sheet 2
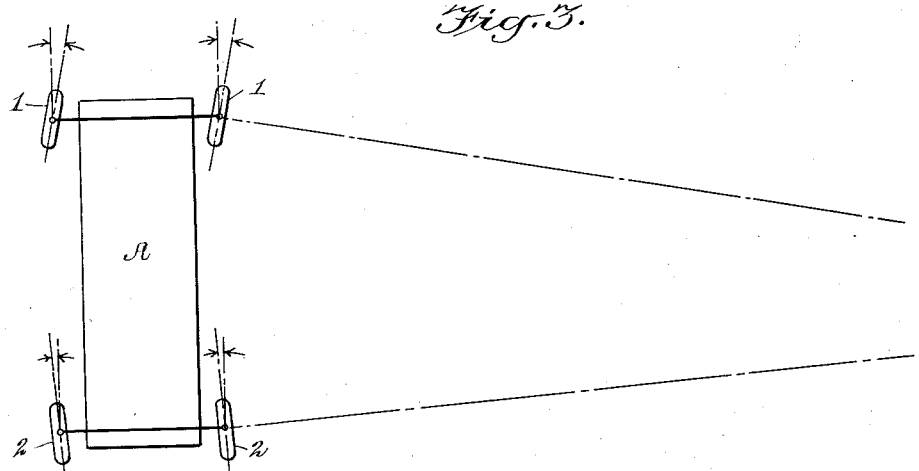
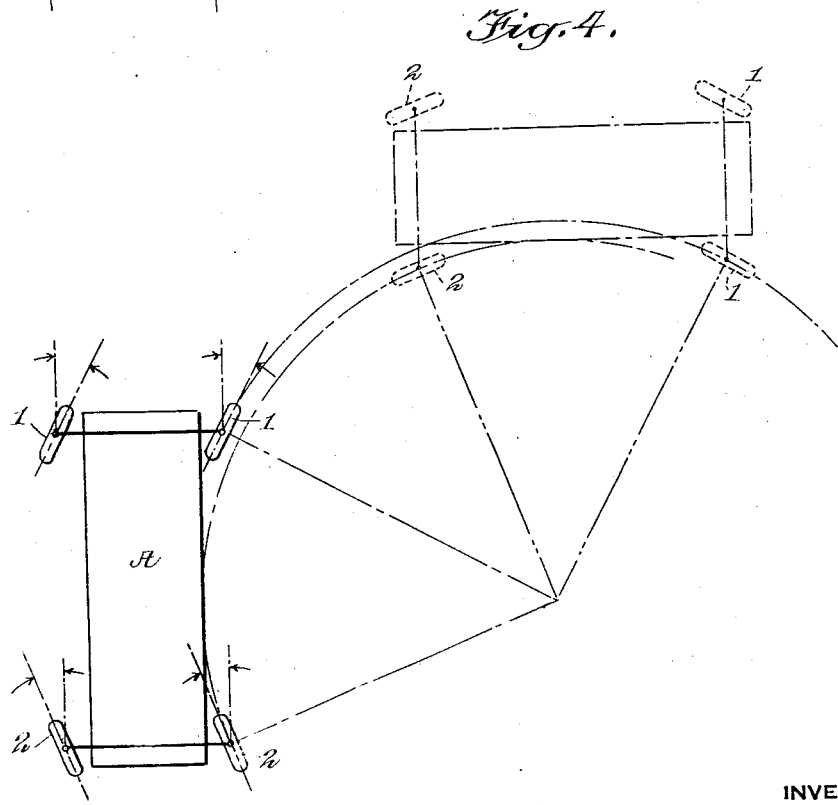
WITNESSES
INVENTOR
Richard B. Ransom
BY
ATTORNEYS Patented June 2, 1936

2,042,482

UNITED STATES PATENT OFFICE 2,042,482

STEERING MECHANISM FOR FOUR-WHEELED VEHICLES

Richard B. Ransom, Nashville, Tenn.

Application September 7, 1934, Serial No. 743,162

4 Claims. (Cl. 280—91)

This invention relates to steering mechanism for four-wheeled vehicles, the primary object of the invention being to provide mechanism which causes a simultaneous deflection of all the wheels but insures a variableness in the movement of the front wheels relative to the movement of the rear wheels.

This invention resides in the introduction of a progressive motion device between a front wheel steering assembly and a rear wheel steering assembly of a wheeled vehicle; so that as the front wheel or wheels are deflected in making a turn the deflection given to the rear wheels is a comparatively small proportion of the deflection of the front wheels at small angles of turn, but this rear wheel deflection is progressively increased so as to be a much larger proportion of the front wheel deflection at larger turning angles. As, for instance, when the front wheels are deflected through an angle of ten degrees the rear wheels may be deflected through an angle of only two degrees, or only one-fifth the angle of deflection of the front wheels; but when the front wheels are deflected by an angle of thirty-six degrees the rear wheels may be deflected through an angle of twenty degrees, perhaps, or more than half the deflection of the front wheels at the greater turning angle.

It is to be understood that in the above and other explanations of the invention, the terms "four-wheeled vehicle" and other references to the front and rear wheels may also be taken to apply to a two-wheeled or a three-wheeled vehicle having a front wheel or wheels and a rear wheel or wheels, and the same terms are meant to apply to the steering of either type of vehicle.

The purpose of the invention is to allow a more flexible and more maneuverable control of vehicles with comparatively long wheel-base than can be provided when steering is accomplished entirely through deflection of the front wheels alone or entirely through deflection of the rear wheels alone; to reduce rear wheel skidding when making turns; to provide a more even motion of the rear of the vehicle when beginning and ending a turn, the unevenness of motion of the rear of the conventionally steered vehicle of long wheel-base being the principal cause of the pitching motion commonly transmitted to rear-seat passengers when a quick turn is made; to allow vehicles of longer wheel-base to be handled with as much or more convenience and economy of space as the shorter vehicles of present practice; and to allow these and other advantages of four-wheel steering without the disadvantages which earlier forms of four-wheel steering have had, particularly at high vehicular speeds.

With these and other objects in view, the invention consists in certain novel features of construction and combinations and arrangements of parts, all of which will be more fully hereinafter described and pointed out in the claims.

In the accompanying drawings—

Figures 3 and 4 are diagrammatic plan views illustrating variable positions of the front and rear steering wheels in making turns.

Figure 1:
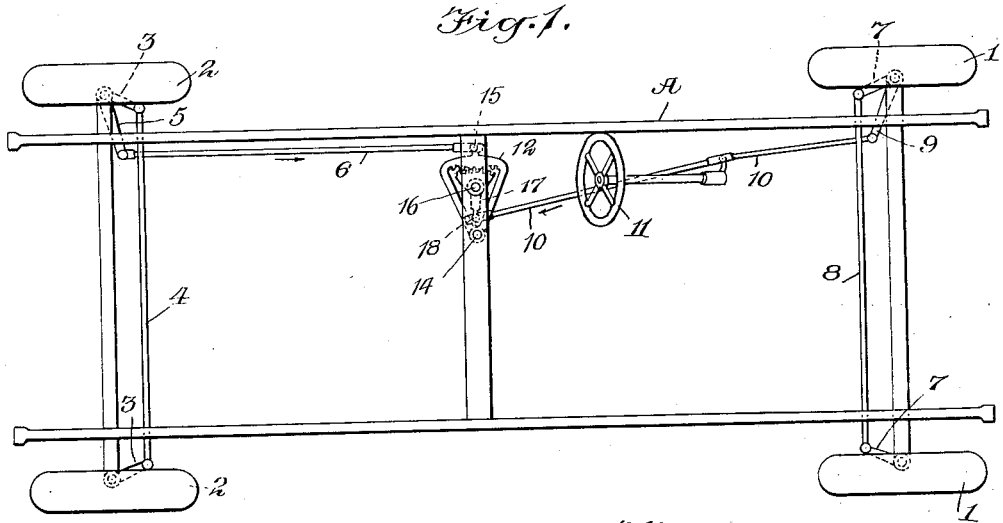
Figure 1 is a plan view somewhat diagrammatical, illustrating my invention applied to the four wheels of a vehicle.

The reference character A is employed to indicate generally the vehicle, which is provided with front steering wheels 1—1 and rear steering wheels 2—2. Steering knuckles 3—3 of the rear wheels 2 have a connecting rod 4, and an arm 5 on one of the steering knuckles is provided with a forwardly projecting connecting rod or drag link 6. Steering knuckles 7—7 of the front wheels have a connecting rod 8, and an arm 9 on one of the steering knuckles is provided with a rearwardly projecting connecting rod or drag link 10 which is operatively connected to a steering wheel 11 or other mechanism for movement thereof.

Figure 2:
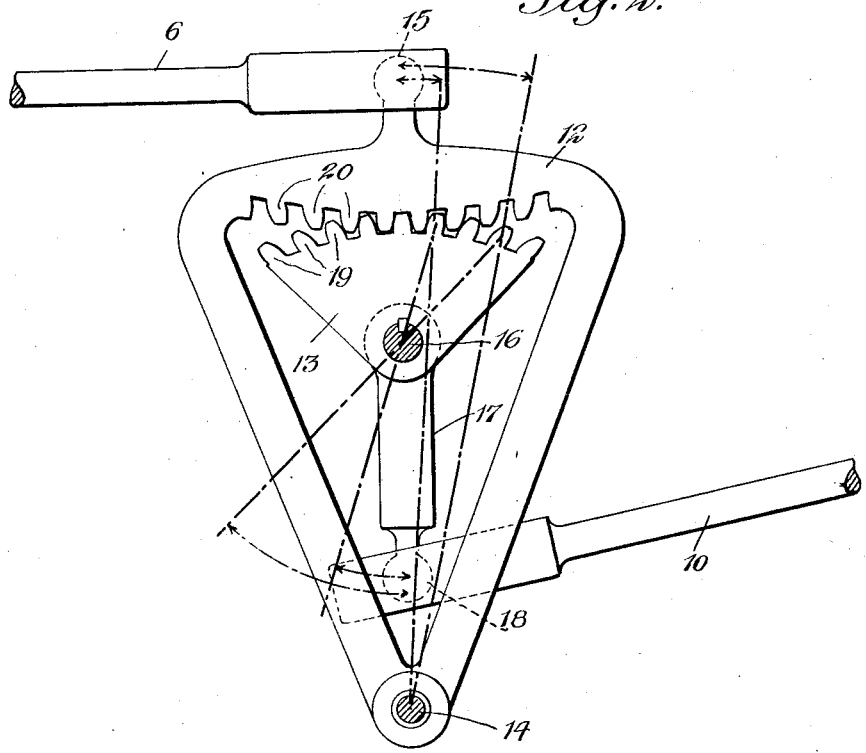
Figure 2 is an enlarged plan view of my improved progressive motion device.

My improved variable motion device, illustrated more specifically in Figure 2 of the drawings, is located intermediate the ends of the vehicle A and consists of an internal gear 12 meshing with an external gear 13. These gears 12 and 13 are in reality segments but they will be hereinafter referred to as gears. The internal gear 12 is of somewhat triangular shape supported at one end on a pivot 14 and having a connection 15, which is preferably a ball and socket connection, at its other end with the connecting rod or drag link 6.

The external gear 13 is supported upon a pivot 16 and has a fixed arm 17 extending from the pivot, and this arm has a connection 18, preferably a ball and socket connection, with the forward connecting rod or drag link 10. It is to be noted that the teeth 19 of the external gear 13 are in an arc approximately a segment of a parabola, and with the pivot of the gear much closer to the gear teeth than their arc is to the focus of the parabola, so that the intermediate tooth of the external gear is nearer the pivot than are the other teeth; in other words, each succeeding tooth of the external gear between both ends of the gear or segment is progressively a greater distance from the pivot than is the central or intermediate tooth.

The curvature or arc of the series of teeth 20 of the external gear 12 is also approximately a section of a parabola as in the case of gear 13, but is oppositely disposed and the pivot of the gear is on the opposite side of the curve from the focus of the parabola. In other words, the fixed center or axis about which the internal gear turns is much nearer the gear teeth which are in mesh when the steering wheels are straight than it is to the teeth which will be in mesh when the mechanism is moved in the operation of steering.

The operation of the mechanism is as follows:

In Figures 1 and 2 of the drawings, the parts are shown in position with the steering wheels 1 and 2 straight; that is, in position for driving the vehicle in a straight line. It will be noted that the internal gear is appreciably longer than the external gear; that is to say, the pivot or fulcrum of the internal gear is a much greater distance away from the teeth of said internal gear than is the distance between the teeth and pivot of the external gear.

As the external gear 13 is deflected or turned from its central position in either direction, teeth are brought into mesh with the internal gear 12 at rapidly increasing distances from the gear center about which the external gear turns, so progressively increasing the leverage with which they will produce motion of the meshed internal gear. In the internal gear, because of the much greater distance between the gear teeth and the fixed center of rotation, this change of distance is proportionately very much less, so that a given amount of motion of the external gear will produce a progressively greater amount of angular turn of the internal gear in proportion as the deflection of the internal gear from its central position is increased.

As the drag link or connecting rod 10 between the front wheel steering assembly and the short driving arm connected with the external gear 13 communicates its motion to this driving arm, the linear motion of the connecting rod is, of course, transformed into angular or turning motion of the external eccentric gear. Because of the comparatively short length of the external gear driving arm, it may easily be arranged that at the limit of deflection of the front vehicular wheels, to right or to left, the external gear shall have turned through an angle of perhaps fifty degrees to sixty degrees or more. At such large angles of turn of the external gear and its driving arm, a small amount of linear motion of the connecting rod 10 is equivalent to a large amount of angular turn of the external gear; while at small angular turns of the external gear and its driving arm from the central position, the same amount of linear motion transmitted from the front steering assembly through the connecting rod 10 will produce a much less amount of angular turn of the external gear. (Corresponding to the relative changes in magnitude of the trigonometric function of the sine and its angle at small angles and at angles approaching 50° to 60°.) On the other hand, the much longer radius by which the meshed teeth of the internal gear 12 are distant from the fixed center or axis about which they turn insures that the total angular turn of the internal gear is comparatively small, never being more than, perhaps, one-third or some such proportion of the angles turned through by the external gear. This smaller angular turn of the internal gear means that the angular motion of the internal gear is transmitted into linear motion of its connecting rod practically unvaried to the rear wheel steering assembly.

These two causes of progressive variation between the motion of the front wheel steering assembly and the rear wheel steering assembly through the progressive motion device are in the same direction and reinforce each other, so that the total result is a large and progressive increase in the angle of deflection of the rear wheel as the angle of deflection of the front wheels is regularly increased in a sharper and sharper turn of the vehicle.

This arrangement allows the front wheels to be deflected proportionately much more than the rear wheels at small angles of vehicular turn; while the rear wheels are deflected progressively more in proportion to the deflection of the front wheels as the angle of deflection of the front wheels is increased. Such a provision has the effect that for small angles of vehicular turn, such as are the turns made at high speed, the major part of the turning effect is produced by the deflection of the front wheels; and that at such small angles of vehicular turn the deflection of the rear wheels is not large enough to produce any immediate or large shift of the rear of the vehicle away from the direction of the turn, but only eases up a little the sharpness of the turn made by the rear of the vehicle, allowing the rear wheels to follow the track of the front wheels a little more nearly than in present conventional front-wheel steering. For very large deflections of the front wheels, however, the progressive motion device allows proportionately larger deflections of the rear wheels also, and at these large deflections of both front and rear wheels the vehicular turn is very much more quickly accomplished and in a much smaller space than when steering is accomplished solely through deflection of the front wheels alone or solely through deflection of the rear wheels alone. The large deflection of the rear wheels at such large angles of vehicular turn also allows the rear wheels to follow much more nearly in the line of travel of the front wheels than in conventional practice, and the rear of the vehicle therefore travels much more nearly at the same rate of speed when making a turn than is the case in a conventionally steered vehicle. Since the front and rear of the vehicle are allowed to travel at much more nearly the same rate of speed when making the turn, it is of course clear that as compared with a conventionally steered vehicle there will be much less change in the speed of the rear of the car when entering the turn, and that this will further be eased up by the progressive nature of the rear wheel deflection, so that the rear of the car will have a much less pitching motion and less tendency to skid when entering the turn.

Figures 3 and 4 of the drawings illustrate diagrammatically the variableness of the angularity between the front and rear steering wheels in making a slight turn and in making a short turn of the vehicle. In Figure 3 it will be noted that the deflection of the rear wheels 2 is only a small proportion of the deflection of the front wheels 1, perhaps one-third or less at the slight turn of the vehicle diagrammed. In Figure 4, however, the deflection of the rear wheels as diagrammed is shown nearly equal to the deflection of the front wheels at the short turn of the vehicle represented.

In Figure 4 the prospective turn of the vehicle through a quarter circle or 90° turn is also outlined. As compared with a conventionally steered vehicle of approximately the same proportions and with the same front wheel deflection, it may be seen from the diagram that the deflection of the rear wheels in the progressive steering design had the effect of shortening the radius of the circle through which the car turns; it allows the rear wheels to follow much more nearly in the same track as the front wheels, and therefore to travel much more nearly at the same speed when making the turn; and that with the progressive four-wheeled steering design of the proportions diagrammed only two-thirds or less space would be required for making the same right-angled turn with the angles of deflection shown for the front wheels. In other words, a car of 112-inch wheel base as here diagrammed could have its wheel base lengthened by fifty per cent, or to 168 inches, and still be turned and maneuvered within the same width street. Such a possible lengthening of wheel base without lessening of maneuverability would, of course, make automobile body designers practically independent of the limitations which now force manufacturers to seat their rear seat passengers almost over their rear wheels and place their engines almost over the front wheels; and would instead allow the weight of all major car units to be substantially slung between the wheel centers instead of above them, to the great improvement of riding comfort and comparative safety.

While I have illustrated what I believe to be the preferred embodiment of my invention, it is obvious that various slight changes may be made with respect to the form and arrangement of parts without departing from my invention, and hence I do not limit myself to the precise details set forth but consider myself at liberty to make such changes and alterations as fairly fall within the spirit and scope of the claims.

I claim:

1. A steering mechanism for vehicles, including front and rear steering wheels, and means operatively connecting the steering wheels, said means constituting a variable mechanism causing the front and rear wheels simultaneous deflections at a progressively variable ratio between the angular dispositions of the front and rear wheels.

2. The combination with a vehicle and front and rear steering wheels supporting the vehicle, of an internal gear operatively connected to the rear steering wheels, an external gear operatively connected to the front steering wheels, said gears meshing with each other, and the pivot of the internal gear being an appreciably greater distance from the teeth thereof than is the distance between the teeth and pivot of the external gear so that the front and rear wheels are simultaneously deflected at a progressively variable ratio between the angular dispositions of the front and rear wheels.

3. The combination with a vehicle and front and rear steering wheels supporting the vehicle, of an internal gear operatively connected to the rear steering wheels, an external gear operatively connected to the front steering wheels, said gears meshing with each other, and the pivot of the internal gear being an appreciably greater distance from the teeth thereof than is the distance between the teeth and pivot of the external gear, and the teeth of the external gear from the center tooth are progressively further from the pivot thereof so that the front and rear wheels are simultaneously deflected at a progressively variable ratio between the angular dispositions of the front and rear wheels.

4. The combination with a vehicle, front and rear steering wheels supporting the vehicle, connecting rods operatively connected to the front and rear wheels respectively, intermeshing external and internal gears connected respectively to the rods, the internal gear being of appreciably greater diameter than the external gear so that the front and rear wheels are simultaneously deflected at a progressively variable ratio between the angular dispositions of the front and rear wheels.

RICHARD B. RANSOM.